United States Patent
Gong et al.

(10) Patent No.: US 9,208,343 B2
(45) Date of Patent: Dec. 8, 2015

(54) TRANSITIVE CLOSURE SECURITY

(75) Inventors: Yu Gong, Half Moon Bay, CA (US); Robert Brown Thyne, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 192 days.

(21) Appl. No.: 13/212,371

(22) Filed: Aug. 18, 2011

(65) Prior Publication Data

US 2013/0047196 A1 Feb. 21, 2013

(51) Int. Cl.
*G06F 17/00* (2006.01)
*G06F 21/62* (2013.01)

(52) U.S. Cl.
CPC .... *G06F 21/6227* (2013.01); *G06F 2221/2105* (2013.01)

(58) Field of Classification Search
CPC ............ H04L 63/0263; G06F 21/6218; G06F 17/30592; G06F 21/6227
See application file for complete search history.

(56) References Cited

U.S. PATENT DOCUMENTS

| | | | |
|---|---|---|---|
| 2005/0278270 A1* | 12/2005 | Carr et al. | 706/25 |
| 2007/0100913 A1 | 5/2007 | Sumner et al. | |
| 2007/0174362 A1* | 7/2007 | Pham et al. | 707/204 |
| 2009/0094424 A1 | 4/2009 | Bondurant et al. | |
| 2009/0198729 A1 | 8/2009 | Gong | |
| 2009/0240717 A1 | 9/2009 | Mimatsu | |
| 2010/0037056 A1 | 2/2010 | Follis et al. | |
| 2010/0037161 A1* | 2/2010 | Stading et al. | 715/764 |
| 2012/0260303 A1* | 10/2012 | Wollnik et al. | 726/1 |

* cited by examiner

*Primary Examiner* — Nirav B Patel
*Assistant Examiner* — Mohammed Waliullah
(74) *Attorney, Agent, or Firm* — Hewlett-Packard Patent Department

(57) ABSTRACT

In one implementation, a plurality of records included in a transitive closure of a driving record is identified, and a record from the plurality of records or the driving record is determined to satisfy a security rule. The security rule is then applied to the driving record and the plurality of records.

19 Claims, 7 Drawing Sheets

TRANSITIVE CLOSURE SECURITY

BACKGROUND

Data stores or the data stored at data stores are often secured by applying security such as encryption to data store structures such as files, database rows, database columns, and database tables. For example, a database can be configured to encrypt data stored at a table of that database. Accordingly, all the data stored at that table is encrypted.

Alternatively, applications that access (e.g., store or retrieve data at) data stores can secure the data accessed at those data stores. In other words, the data stored at a data store can be secured by an application using the data store rather than by the data store. Such applications, therefore, implement security or security methodologies that operate on the data accessed by those applications at data stores.

DETAILED DESCRIPTION

Figure 1:
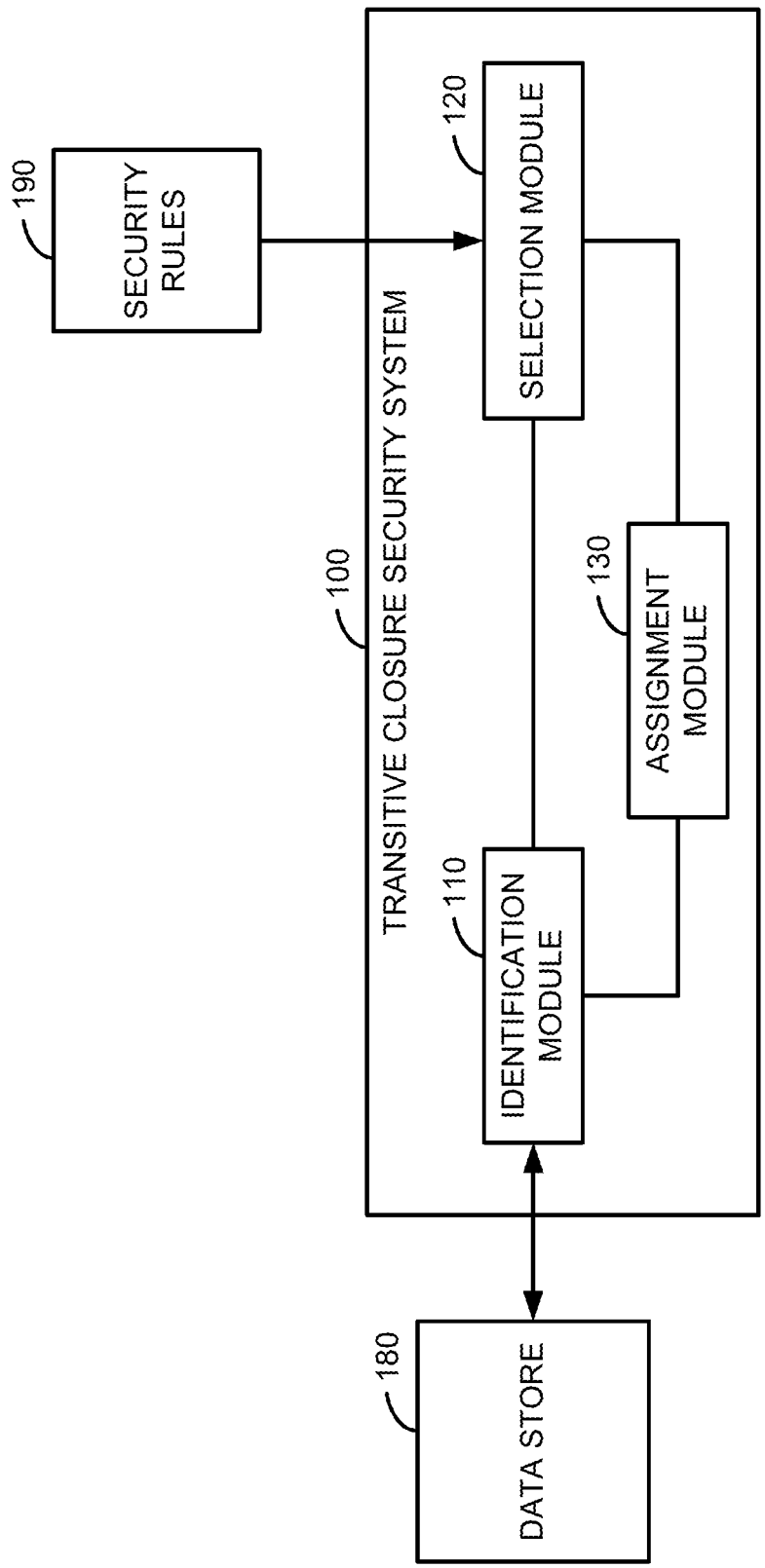
FIG. 1 is an illustration of an environment including a transitive closure security system, according to an implementation.

Data stores such as file systems, databases (e.g., standalone databases, distributed databases, and federated databases), and indexes, for example, store or house records including data from applications (e.g., software applications, services, or resources hosted at a computing device). A record is a group of data (e.g., a collection of bytes representing information) such as, for example, a file, a block, a page, a database row, a database column, a database object, or other group of data at a data store.

Because a data store can store records from different applications and security requirements of data of each record at a data store can differ, applying a single level (e.g., type, class, or methodology) of security to a data store (or data store structure) can be inefficient (e.g., result in wasted processing or storage resources to secure data with a higher-than-necessary level of security) and inappropriate (e.g., violate principles of security dictating adequate, but not excessive levels of security for data based on security needs or demands). Accordingly, applying a single security methodology to a data store (e.g., all the records in a data store or a structure such as a table of a data store) is often not ideal or desirable. Moreover, some applications are ill-suited or cannot be modified to apply security to data stored at records of data stores.

Furthermore, often, a record at a data store is related to other records within the data store based on data-store-dependent relationships and/or data-store-independent relationships. Data-store-dependent relationships are relationships among records at a data store that are defined and/or enforced (or maintained) by the data store. Data-store-dependent relationships include relationships such as referential constraints (e.g., foreign key restrictions), consistency restrictions or validations, record modification cascade rules, and other relationships that are defined and enforced within the data store.

Data-store-independent relationships are relationships among records at a data store that are maintained by an entity (e.g., a process or application) external to the data store such as an application, for example. That is, data-store-independent relationships are maintained independent of the data store. For example, a data-store-independent relationship can be defined or maintained by an application using fields (or portions) of records. More specifically, for example, an application can establish a data-store-independent relationship between records by storing a common (e.g., a single) value at a field of related records. As a specific example, an application can define a relationship between rows (or records) of different tables within a database by storing the same value at particular columns of related rows. As another example, an application can establish a data-store-independent relationship between records by storing a reference, pointer, or other identifier associated with one record at a field of another record. The record that includes the reference and the record associated with the reference are related. In other words, data-store-independent relationships are defined by a data model of an application, and data-store-dependent relationships are defined by the structure and actions of the data store.

The group or set of records in a data store that are related— directly or indirectly according to one or more data-store-independent relationships—to a record are referred to herein as a transitive closure for (or of) a record. A transitive closure can be an application data model, an application partition, a business partition, a transaction partition, or some other group of records in a data store that are associated by one or more data-store-independent relationships. As used herein, the term "driving record" refers to a record for which a transitive closure is identified. Moreover, the transitive closure of a driving record can be said to include the driving record. In other words, the records in a transitive closure of a driving record are comprised of the driving record, the records to which that driving record is directly related, and the records to which that driving record is related through relationships with other records (or indirect relationships).

Due to such relationships, records should be secured in the context of their respective transitive closures to allow later access to each record and the records related to that record. That is, it can be desirable to apply common security (or a single security methodology) to all the records in the transitive closure of a driving record to allow subsequent access to the records related to that driving record with a single access methodology. As a specific example, it can be desirable to encrypt the records in the transitive closure of a driving record and the driving record using a single encryption methodology (e.g., cipher) and key to allow each of these records to be accessed using a single decryption methodology and key. In this way, records and relationships among records are protected as a whole, to prevent opportunities or vector for malicious users or intruders to infer information from exposed relationships. Furthermore, the security applied to the transitive closure is appropriate because it can specifically address needs or requirements of an application.

Implementations discussed herein identify records in a transitive closure of a driving record and secure the records and the driving record using a common security methodology. Moreover, some implementations discussed herein evaluate security rules that are satisfied by records in a transitive closure of a driving record to select a security rule (or a subset of the security rules) based on security levels of the security rules. The selected security rule is then applied to those records. For example, the security rule can define a security methodology that is applied to those records. Accordingly, a record (e.g., a driving record) and related records at a data store can be secured using a common security methodology.

Such implementations allow, for example, a security rule (e.g., a rule that define a security situation and a security mechanism (or methodology) to be applied for that security situation) to be defined for an application data model of information stored at a data store. Thus, a particular security mechanism can be applied to that application data model (e.g., a transitive closure) when the security situation exists for that application data model (e.g., one of the records in that application data model satisfies a condition that describes the security situation). Moreover, security rules can have properties or characteristics such as scope and a security severity or level. These properties can be used to determine which security mechanism is applied to an application data model when a security situation occurs.

As used herein, the singular forms "a," "an," and "the" include plural referents unless the context clearly dictates otherwise. Thus, for example, the term "record" is intended to mean one or more records or a combination of records. Additionally, as used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted or at a processor), or hardware and software hosted at hardware.

FIG. 1 is an illustration of an environment including a transitive closure security system, according to an implementation. Although various modules are illustrated and discussed in relation to FIG. 1 and other example implementations, other combinations or sub-combinations of modules can be included within other implementations. Said differently, although the modules illustrated in FIG. 1 and discussed in other example implementations perform specific functionalities in the examples discussed herein, these and other functionalities can be accomplished at different modules or combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

Figure 2:
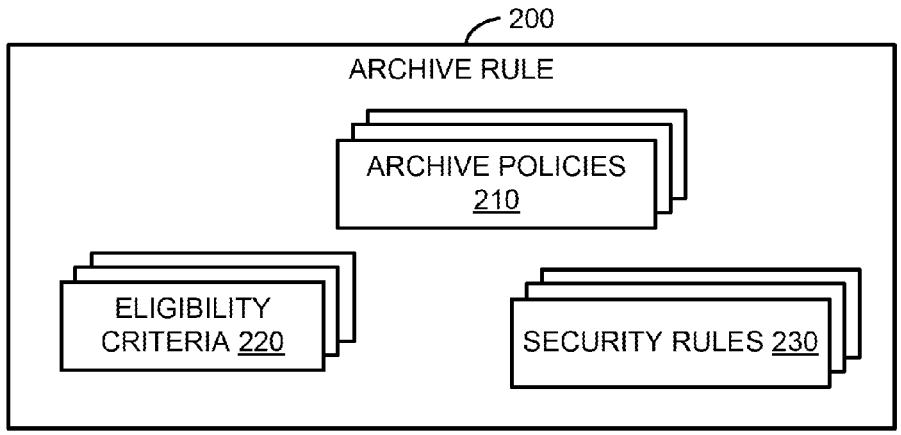
FIG. 2 is an illustration of an archive rule, according to an implementation.

Transitive closure security system 100 secures records at data store 180 according to or based on security rules 190. Transitive closure security system 100 includes identification module 110, selection module 120, and assignment module 130. Identification module 110 identifies records at data store 180 that are included within a transitive closure of a driving record. For example, identification module 110 can select or access a driving record based on an archive rule during an archive process. FIG. 2 is an illustration of archive rule 200 including archive policies 210, eligibility criteria 220, and security rules 230, according to an implementation. Security rules 190 can be, for example, security rules 230 of archive rule 200 illustrated in FIG. 2.

Identification module 110 can select a record (or a group of records) at data store 180 as a driving record based on archive policies 210. That is, records at data store 180 can be compared with archive policies 210, and a record that satisfies (e.g., matches or satisfies conditions of) one or more of archive policies 210 can be selected as a driving record. Identification module 110 then identifies records included within the transitive closure of that driving record. Also, in the calculation or identification of the transitive closure, identification module 110 evaluates records in the transitive closure relative to eligibility criteria 220 to determine whether a partially-formed transitive closure is eligible for archival.

For example, to determine whether the records in the transitive closure are eligible to be archived. As a specific example, an archive policy can specify that all records related to a project that is 3 years old or greater should be archived. After the transitive closure of a driving record for that project is identified, eligibility rules that specify whether particular records are eligible for archiving can be applied to the transitive closure. Such an eligibility rule can specify, for example, that any records that are marked or flagged as "active" or "in use" are not eligible for archiving. Accordingly, records in the transitive closure that are flagged as "active" or "in use" cannot be archived. Such records can be, for example, excluded from the transitive closure, included in the transitive closure and not deleted from the data store, or the transitive closure can be prevented from being archived.

In some implementations, archive policies and eligibility rules can be included in a common rule or group of rules. That is, for example, a driving record can be selected based on such a rule or group of rules and a transitive closure can be compared with such a rule or group of rules to determine whether the records in the transitive closure are eligible for archival. In other words, archive policies and eligibilities rules can be combined into a single rule or group of rules.

Selection module 120 accesses the records identified at identification module 110 (i.e., records in the transitive closure of the driving record) and selects a security rule that should be applied to those records. A security rule defines or describes a security situation or event and an action (e.g., a security target) that should be applied to records in a transitive closure with a record that satisfies the security rule. For example, each security rule can include a condition that can be satisfied by a record in the transitive closure of the driving record. Selection module 120 can compare the condition of each security rule with those records to determine which security rules are satisfied by those records, and select a security rule from the satisfied security rules.

Figure 3:
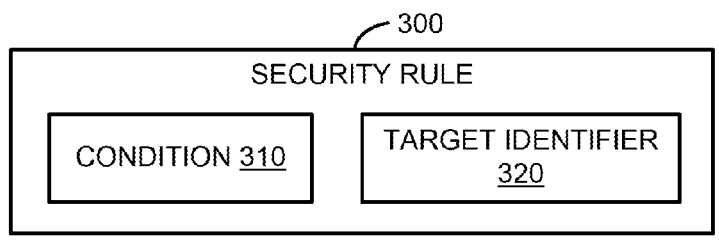
FIG. 3 is an illustration of a security rule, according to an implementation.

As an example of a security rule, FIG. 3 is an illustration of a security rule, according to an implementation. Security rule 300 includes condition (or security condition) 310 and target identifier 320. Condition 310 includes a criterion or multiple criteria that can be satisfied (or matched) by one or more records. A security situation or event can be said to have occurred if a security condition is satisfied by a record. Furthermore, a security rule or security condition can be defined with reference to multiple tables. For example, a security rule defined on or with reference to multiple tables can provide enhanced correlation of security situations on tables that include records within a transitive closure.

As an example, condition 310 can include an expression such as a Boolean expression, a regular expression, a structured query language expression, some other expression, or a combination thereof that selection module 120 can compare with records or portions of records (e.g., fields of records) from the transitive closure of the driving record to determine whether those records satisfy condition 310. Selection module 120 can similarly compare each of security rules 190 with the records in the transitive closure of the driving row, and select a security rule to apply to the records in the transitive closure of the driving record. Security rules with conditions that are satisfied by records can be said to be satisfied and can be referred to as satisfied security rules.

Selection module 120 can select a security rule from satisfied security rules using a variety of methodologies. For example, selection module 120 can select the first security rule that is satisfied. Alternatively, selection module 120 can select a satisfied security rule from the satisfied security rules based on a security preference. For example, target identifier 320 identifies a security target associated with security rule 300. As a specific example, a record that satisfies condition 310 is eligible for the security target identified by target identifier 320. A security target is a module, methodology, or operation of security that can be applied to a record or group of records. For example, target identifier can identify a security target such as an encryption cipher or methodology, a digest module or methodology, a hash module or methodology, a digital signature module or methodology, a key management module or methodology, a data store such as a secured or encrypted data store, a secure or encrypted communications link, some other security that can be applied to records of a data store, or a combination thereof. Selection module 120 can select security rules based on a security preference that defines an order of preferred security targets using target identifiers of security rules.

Figure 4:
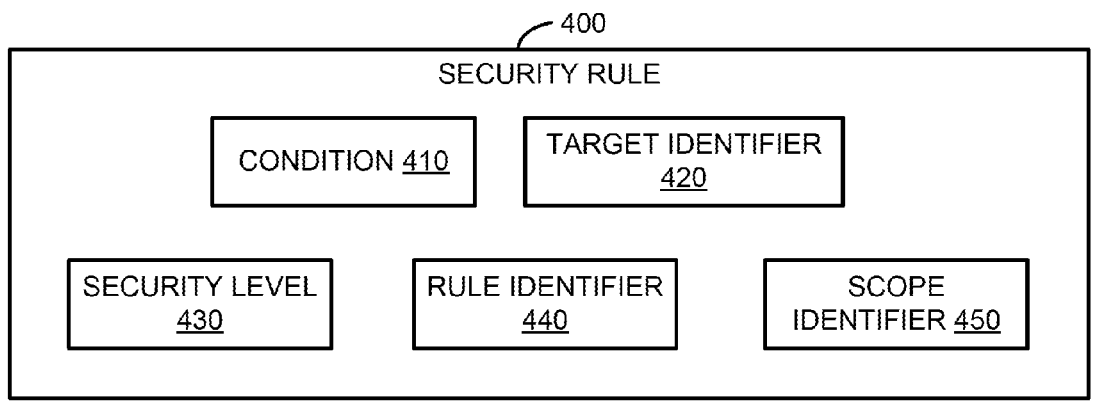
FIG. 4 is an illustration of a security rule, according to another implementation.

Alternatively, for example, security rules can include additional properties or parameters that can be used by selection module 120 to select a security rule from a group of satisfied security rules. For example, FIG. 4 is an illustration of a security rule, according to another implementation. Security rule 400 includes condition 410, target identifier 420, security level 430, rule identifier 440, and scope identifier 450. Security level 430 describes the level of security provided by the security target identified by target identifier 420. For example, security level 430 can have values such as high, medium, low, or other values that describe a relative or absolute level of security. In some implementations, selection module 120 selects a security rule from the satisfied security rules using security levels of the satisfied security rules. For example, the highest or most secure security rule can be selected based on the security levels.

Rule identifier 440 identifies each security rule from a group of security rules. For example, each of security rules 190 can include a unique rule identifier. Accordingly, selection module 120 can select a security rule from the satisfied security rules based on preferences for particular security rules. That is, selection module 120 can select a security rule from the satisfied security rules according to preferences for certain security rules using the rule identifiers of the satisfied security rules.

Scope identifier 450 identifies the scope or specificity of security rule 400. In other words, scope identifier 450 describes which records or portions thereof in the transitive closure of the driving set should be applied to the security target identified by target identifier 420 if a record in the transitive closure satisfies security rule 400 (or condition 410). For example, scope identifier 450 can identify a value or field scope (e.g., a particular field within a record or records that satisfy record 400 should be applied to the security target identified by target identifier 420), a record scope (e.g., a record or records that satisfy record 400 should be applied to the security target identified by target identifier 420), transitive closure scope (e.g., the records in the transitive closure of a driving record should be applied to the security target identified by target identifier 420 if any record in the transitive closure satisfies security rule 400), or some other scope. The specificity of a scope identifier is inversely proportional to the number of records (or portions thereof) included in that scope identifier. That is, a scope identifier that applies to many records (e.g., transitive closure scope) is less specific than a scope identifier that applies to few records (e.g., value or field scope). Similarly, a scope identifier that applies to few records is more specific than a scope identifier that applies to many records.

In some implementations, selection module 120 can select a security rule from the satisfied security rules based on the scope of the satisfied security rules. As a specific example, selection module 120 can select the least specific security rule (i.e., the security rule that applies to the most records in the transitive closure) from the satisfied security rules. That is, using the scopes discussed above, selection module 120 can select a security rule that has a transitive closure scope (e.g., the security rule applies to all the records in the transitive closure) before a security rule that has a record scope (e.g., the security rule applies to the record that satisfies the security rule) because the security rule with the transitive closure scope is less specific than the security rule with the record scope. Moreover, selection module 120 can select a security rule using multiple, different, or additional parameters, properties, criteria, or methodologies. In some implementations, security rules with different scope do not conflict with each other. Conflict resolution of security rules with the same (or a common) scope is performed by selection module 120. For example, precedence can be given to the rule with higher security level. Alternatively, for example, selection module 120 can notify a user that a conflict exists, and allow the user to resolve the conflict (e.g., allow the user to select a security rule to be applied) via an interface such as a graphical user interface (GUI) or a command line interface (CLI).

After selection module 120 selects a security rule, assignment module 130 assigns the records from the transitive closure of the driving record that satisfy the selected security rule to the security target identified by the target identifier of the selected security. As an example, assignment module 130 can schedule a process, job, or task to provide those records to that security target.

Figure 5:
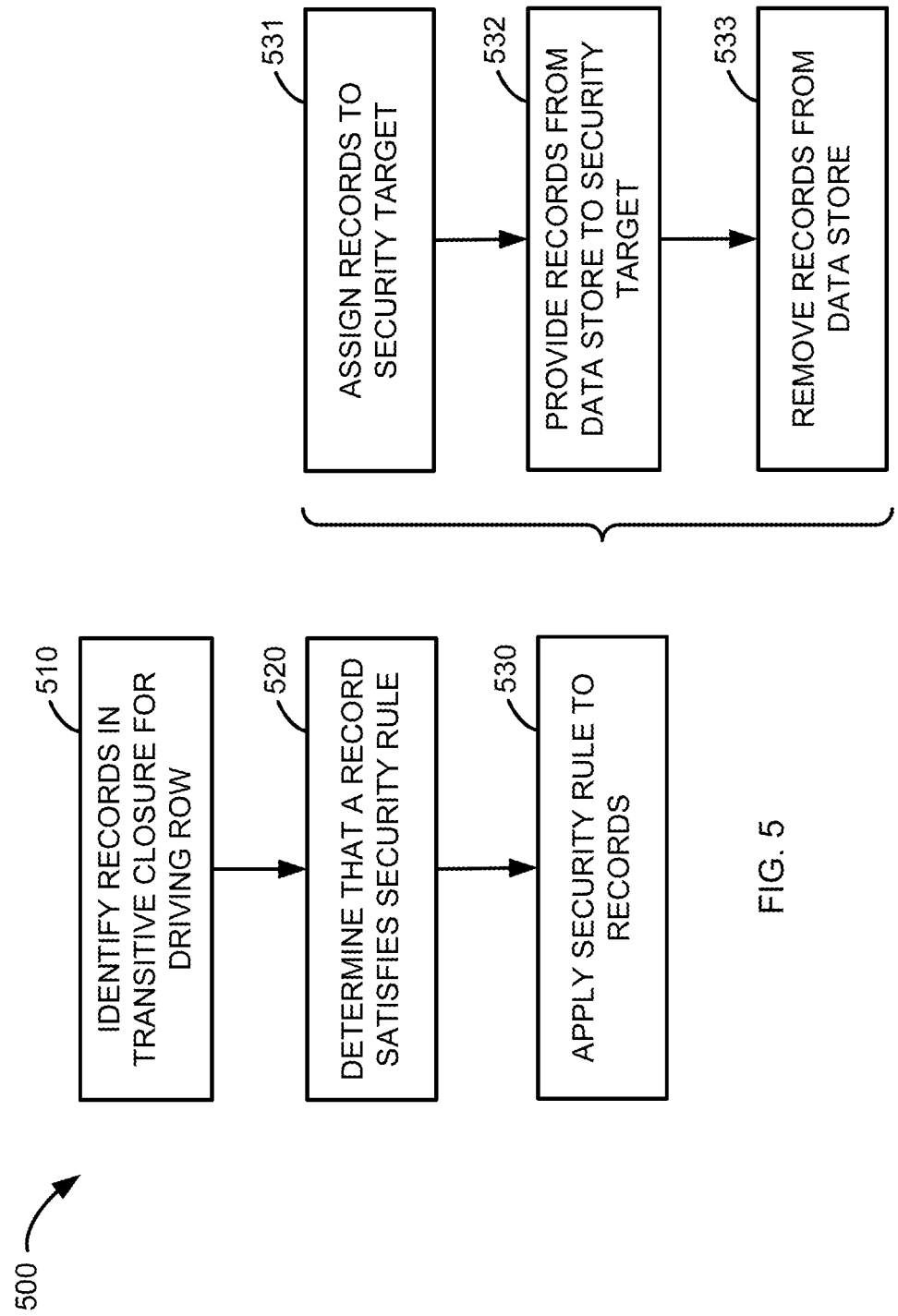
FIG. 5 is a flowchart of a transitive closure security process, according to an implementation.

FIG. 5 is a flowchart of a transitive closure security process, according to an implementation. Process 500 can be implemented at, for example, a transitive closure security system such as transitive closure security system 100 illustrated in FIG. 1. Records in a transitive closure of a driving record are identified at block 510. A transitive closure of a driving record can be identified using a variety of methodologies. For example, a transitive closure security system implementing process 500 (or an identification module thereof) can search a data store to identify records that directly or indirectly are related to or have a relationship with (e.g., refer to or are referred to by) the driving record. In some implementations including a relational database data store, one or more join operations can be used to identify records that are directly or indirectly related.

Data-store-independent relationships (or description or definitions thereof) that describe how records are used by an application to relate records one to another can be accessed to determine whether two or more records are related. Such data-store-independent relationships can describe, for example, fields of records that store values to indicate that two or more records are related. For example, records that have the same or similar values at fields specified in a data-store-independent relationship can be determined to be related. Moreover, data-store-independent relationships can describe rules that define what values are the same or similar. For example, a data-store-independent relationship can include textual, numeric, or other rules such as regular expressions to define which or whether values are the same or similar. As a specific example, a data-store-independent relationship can include a regular expression to specify that comparisons of values of records (or field thereof) should be case-insensitive.

As another example, the records within the data store can include multiple fields, each of which includes a value. An identification module can access the value of a particular field at the driving record, and search or traverse the data store to find (or identify) other records that include that value (or a similar value) at a corresponding field (e.g., a field that together with that particular field is used by an application to store data related to or which indicates a relationship with another record). The same or similar values at these fields of records can indicate to an identification module that these records are related. In other words, values of fields of records can indicate that two or more records are related or have (or share) a relationship. A data-store-independent relationship can define which fields of records are used to relate or indicate a relationship among record. As a specific example, data-store-independent relationship can define which fields correspond to other fields.

Additionally, relationships between a driving record and records in the transitive closure of that driving set can be indirect. That is, the driving record and a first record to which the driving record is directly related can have a first relationship, and the first record and a second record to which the first record is directly related can have a second relationship. The driving record is therefore directly related to the first record and indirectly related to the second record (i.e., the indirect relationship of or between the driving record and second record is defined by the first relationship and second relationship). Moreover, indirect relationships can have additional degrees of indirection. In other words, an indirect relationship can be defined by more than two direct relationships and/or additional indirect relationships.

Figure 6:
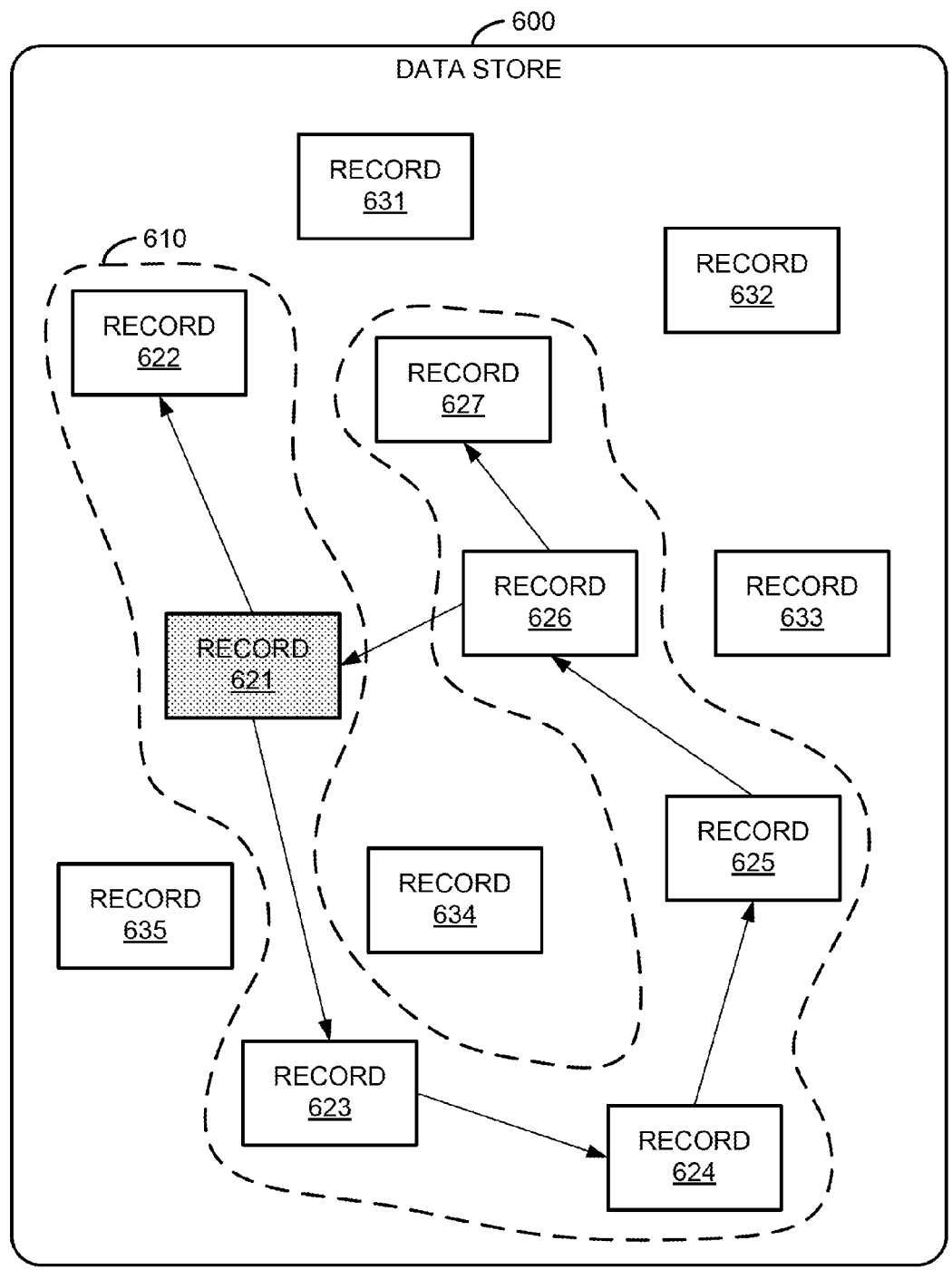
FIG. 6 is an illustration of a data store including a group of records and a transitive closure of a record, according to an implementation.

As an example, FIG. 6 is an illustration of a data store including a group of records and a transitive closure of a record, according to an implementation. Data store 600 includes records 621-627 and records 631-635. For the purposes of this example, record 621 is a driving record. Records 621-627 are included within transitive closure 610 of record 621. Transitive closure 610 can be identified as follows. Record 621 is selected or identified as a driving record based on, for example, an archive policy and/or eligibility criteria. A field of record 621 that is used by an application to relate or associate records at data store 600 is accessed and the value of that field identified. Data store 600 (or, in some implementations, an index thereof) is then searched for records that have that or a similar or matching value at a corresponding field (e.g., a field of other records used by the application to relate or associate records), and records 622 and 623 are identified as such records.

As a specific example, data store 600 can be a database with multiple tables. Record 621 can be a row of a first table, record 622 can be a row of a second table, and record 623 can be a row of a third table. The field can be, for example, a project identifier column of each table. The project identifier column of record 621 can have a value, and the project identifier column of record 622 and record 623 also have that value. Accordingly, records 622 and 623 can be identified as related to record 621. That is, a data-store-independent relationship is defined by the project identifier columns of the first, second, and third tables.

In other words, a data-store-independent relationship is defined based on the field of record 621 and the corresponding fields of records 622 and 623, and is used to identify that records 622 and 623 are related to record 621. Said differently, an application stores a common or similar (e.g., the same) value at the field of record 621 and at the corresponding fields of other records related to record 621. The field of record 621 and the corresponding fields of other records can be defined, described, and/or identified at descriptions or representations of relationships.

A similar procedure is repeated for records 622 and 623. For record 622, either there is no field used by an application to relate record 622 to additional records, or there is no record at data store 600 that includes the value (or a similar value) at a field of record 622 that is used by an application to relate record 622 to additional records. Said differently, an application does not define a relationship between record 622 and records other than record 621.

For record 623, a field used by an application to relate record 623 to additional records includes a value that is also at record 624. That is, record 623 is also related to record 624. As a specific example, records 623 and 624 can each include a document identifier (or reference) column that is used by an application to define a relationship between records, and records 623 and 624 can have the same value at their respective document identifier columns. That is, records 623 and 624 can be identified as related because they have the same value at columns that are used by an application to relate records. Similarly, data store 600 can be searched to determine that record 624 is related to record 625, that record 625 is related to record 626, and that record 626 is related to records 621 and 627.

Such searching can be processed, for example, iteratively, recursively, or in parallel. After the searching is complete (e.g., no additional records are identified as related to other records during a search of data store 600), records 622 and 623 have been identified as directly related to record 621, and records 624-627 as indirectly related to record 621. Accordingly, 621-627 are identified as included within transitive closure 610.

Although the preceding discussion is in the context of data-store-independent relationships, a transitive closure of a record can be defined or identified using a combination of data-store-independent relationships and data-store-dependent relationships. In other words, some relationships between records in a transitive closure of a driving record can be data-store-independent relationships and other relationships can be data-store-dependent relationships.

Data-store-independent relationships (or descriptions or representations thereof) can be accessed or determined using a variety of methodologies. For example, data-store-independent relationships can be accessed by having a system administrator describe such data-store-independent relationships known to that system administrator. The data-store-independent relationships can be described using a graphical user interface (GUI) drawing tool that allows the system administrator to draw the hidden relationship onto a diagram of structures of the data store. The data-store-independent relationships can be graphically displayed using a different illustration (e.g., linkage or line) other than an illustration used to display data-store-dependent relationships in the diagram.

For example, a link representing the data-store-independent relationships can be dotted, red-colored, or otherwise emphasized for the benefit of the system administrator. Alternatively, the data-store-independent relationships can be described using a text format or another useful format that is not graphical. Thus, a transitive closure security system can include a module to receive and/or interpret a representation of data-store-independent relationships.

In some implementations, data-store-independent relationships can be obtained by examining software code or instructions of an application. For example, a transitive closure security system or interpreter module thereof can search through electronic locations where rules defining implicit application relationships are known to be or potentially stored. For example, a data-store-independent relationship between records of a first table and a second table of a database can be obtained by inspecting business rules located in a middleware software layer associated with the database. More specifically, for example, an interpreter module configured to interpret the meaning of middleware rules can be used to find or recognize descriptions of data-store-independent relationships that are not defined in the data store (e.g., data-store-dependent relationships) in code or instructions.

Data-store-independent relationships can also be located in an application itself (e.g., within source code, object code, machine code, or other instructions that can be executed at a processor to realize an application). If these data-store-independent relationships are well-defined and accessible to the transitive closure security system, then such data-store-independent relationships can also be used to identify a transitive closure of a record. For example, a Java™ applet may be reverse engineered or reverse interpreted to determine what hidden linkage is created or a trigger can be interpreted for the same reason. Another location of data-store-independent relationships may be found by inspecting triggers or business rules associated with a data store that does not provide an explicit linkage (or data-store-dependent relationships) between various structures (e.g., tables) of the data store.

Referring to FIG. 5, a transitive closure security system implementing process 500 proceed from block 510 to determine that a record from the transitive closure of the driving record satisfies a security rule. In some implementations, the driving record is compared with the security rule (or a condition of the security rule) to determine that the driving record satisfies the security rule. In other implementations, multiple records from the transitive closure are compared with the security rule to determine whether any record from the transitive closure satisfies the security rule.

Such rules defined relative to multiple tables can provide useful and powerful correlations among security situation for an application. For example, forensic discovery can be applied to database applications. That is, for example, a transitive closure of records can be identified to discover correlations among records in a database related to records that triggered a security situation. In other words, a transitive closure of a record or a group of records can be provided to a particular security target for forensic discovery or analysis if that record or group of records triggers a security situation.

After a record that satisfies the security rule is found (or located or identified), the security rule is applied to the records of the transitive closure. That is, actions defined or described in the security rule are applied to the records of the transitive closure. For example, as illustrated in FIG. 5, applying a security rule to the records of the transitive closure includes assigning the records to a security target at block 531 (e.g., a security target identified at the security rule), providing the records from a data store to the security target at block 532, and removing the records from the data store at block 533. In some implementations, providing the records to the security target a block 532 includes encrypting the records and copying the records to a location or resource other than the data store. For example, the records can be encrypted and copied to another data store.

In some implementations, applying a security rule to records of a transitive closure includes fewer, additional, or different steps than those illustrated at blocks 531, 532, and 533. For example, in some implementations, applying a security rule to records of a transitive closure includes only assigning the records to a security target (e.g., marking, allocating, or appointing those records for that security target). In other implementations, for example, applying a security rule to records of a transitive closure includes assigning the records to a security target and providing the records to a security target, but does not remove the records from the data store. Moreover, FIG. 5 is an illustration of one example of a transitive closure security process. Other transitive closure security processes can include fewer, additional, or different steps than those illustrated at blocks 510, 520, and 530.

Figure 7:
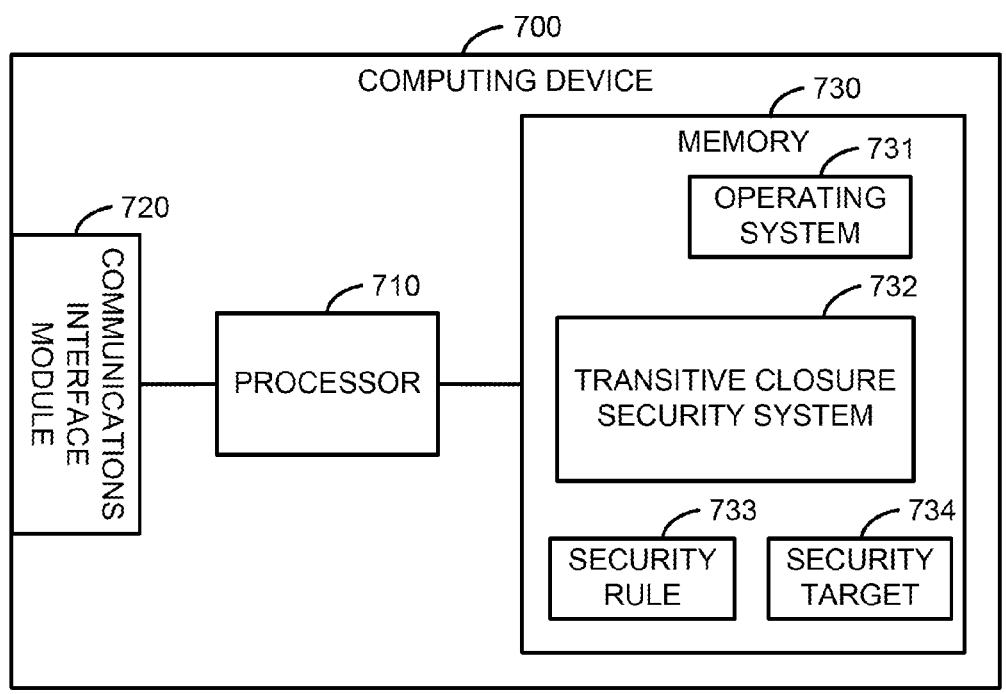
FIG. 7 is an illustration of a computing device configured as a transitive closure security system, according to an implementation.

FIG. 7 is an illustration of a computing device configured as a transitive closure security system, according to an implementation. For example, as illustrated in FIG. 7, computing device 700 hosts or executes transitive closure security system 732 at processor 710, causing processor 710 (or computing device 700) to function or operate as a transitive closure security system. As a specific example, transitive closure security system 732 can include instructions or code that when executed at processor 710 cause processor 710 (alone or together with other components of computing device 700) to perform process 500 or process 800 discussed in relation to FIGS. 5 and 8, respectively.

Computing device 700 includes processor 710, communications interface module 720, and memory 730. In some implementations, computing device 700 also includes an input interface module, input device, output interface module, and/or output device. Processor 710 is any combination of hardware and software that executes or interprets instructions, codes, or signals. For example, processor 710 can be a microprocessor, an application-specific integrated circuit (ASIC), a distributed processor such as a cluster or network of processors or computing device, or a virtual machine.

Communications interface module 720 is a module in communication with processor 710 via which computing device 700 communicates (e.g., exchange symbols or signals representing data or information) with other computing devices, data stores, security targets, and/or services via, for example, a communications link (e.g., a wired communications link, optical communications link, or wireless communications link). Communications interface module 720 can include hardware (e.g., pins, connectors, or integrated circuits) and software (e.g., drivers or communications stacks). For example, communications interface module 720 can implement an electrical communications interface, an optical communications interface, a wireless communications interface, an Ethernet interface, a Fiber Channel interface, an Infini-Band interface, or another communications interface.

Memory 730 is a non-transitory processor-readable medium that stores instructions, codes, data, or other information. For example, memory 730 can be a volatile random access memory (RAM), a persistent data store such as a hard disk drive or a solid-state drive, or a combination thereof or other memories. In some implementations, memory 730 can include a variety of memories or other processor-readable media. For example, memory 730 can include RAM, a hard disk drive, a solid-state drive, a compact disc (CD), a digital video disc (DVD), a Secure Digital™ (SD) memory card, a MultiMediaCard (MMC) memory card, a CompactFlash™ (CF) memory card, or a combination thereof. Furthermore, memory 730 can be integrated with processor 710, separate from processor 710, or external to computing device 700.

As illustrated in FIG. 7, memory 730 includes operating system 731, transitive closure security system 732, security rule 733, and security target 734. Operating system 731, transitive closure security system 732, and security target 734 are each instructions or code that—when executed at processor 710—cause processor 710 to perform operations that implement, respectively, an operating system, a transitive closure security system, and a security target (e.g., an encryption process). Said differently, operating system 731, transitive closure security system 732, and security target 734 are hosted at computing device 700. For example, the instructions or codes of transitive closure security system 732 can cause processor 710 to access or interact with communications interface module 720 to access records at a data store accessible via communications interface module 720. In some implementations, security target 734 can be external to or remote from computing device 700. Moreover, in some implementations, security target 734 can include a component at computing device 700 such as an encryption module at memory 730, and a component external to computing device 700 such as a data store remote from computing device 700.

As discussed above, memory 730 can be or include a variety of memories or other processor-readable media. In such implementations, operating system 731, transitive closure security system 732, security target 734, and/or other modules of computing device 700 can be located or stored at different memories or other processor-readable media. For example, operating system 731 can be stored at a hard disk drive, transitive closure security system 732 can be stored at a DVD, security rule 733 can be stored in RAM, and other modules can be stored at an SD memory card.

In some implementations, computing device 700 can be a virtualized computing device. For example, computing device 700 can be hosted as a virtual machine at a computing server. Moreover, in some implementations, computing device 700 can be a virtualized computing appliance, and operating system 731 is a minimal or just-enough operating system to support (e.g., provide services such as a communications stack and access to components of computing device 700 such as communications interface module 720) transitive closure security system 732.

Transitive closure security system 732 can be accessed or installed at computing device 700 from a variety of memories or other processor-readable media. For example, computing device 700 can access a remote processor-readable medium via communications interface module 720 and transitive closure security system 732 or an installation package including transitive closure security system 732 at that processor-readable medium. As a specific example, computing device 700 can be a thin client that accesses operating system 731 and transitive closure security system 732 during a boot sequence.

As another example, computing device 700 can include a processor-readable medium access device (e.g., CD, DVD, SD, MMC, or a CF drive or reader) and access transitive closure security system 732 at a processor-readable medium via that processor-readable medium access device. As a more specific example, the processor-readable medium access device can be a DVD drive at which a DVD including an installation package for transitive closure security system 732 is accessible. The installation package can be executed or interpreted at processor 710 to install transitive closure security system 732 at computing device 700 (e.g., at memory 730). Computing device 700 can then host or execute transitive closure security system 732.

Figure 8:
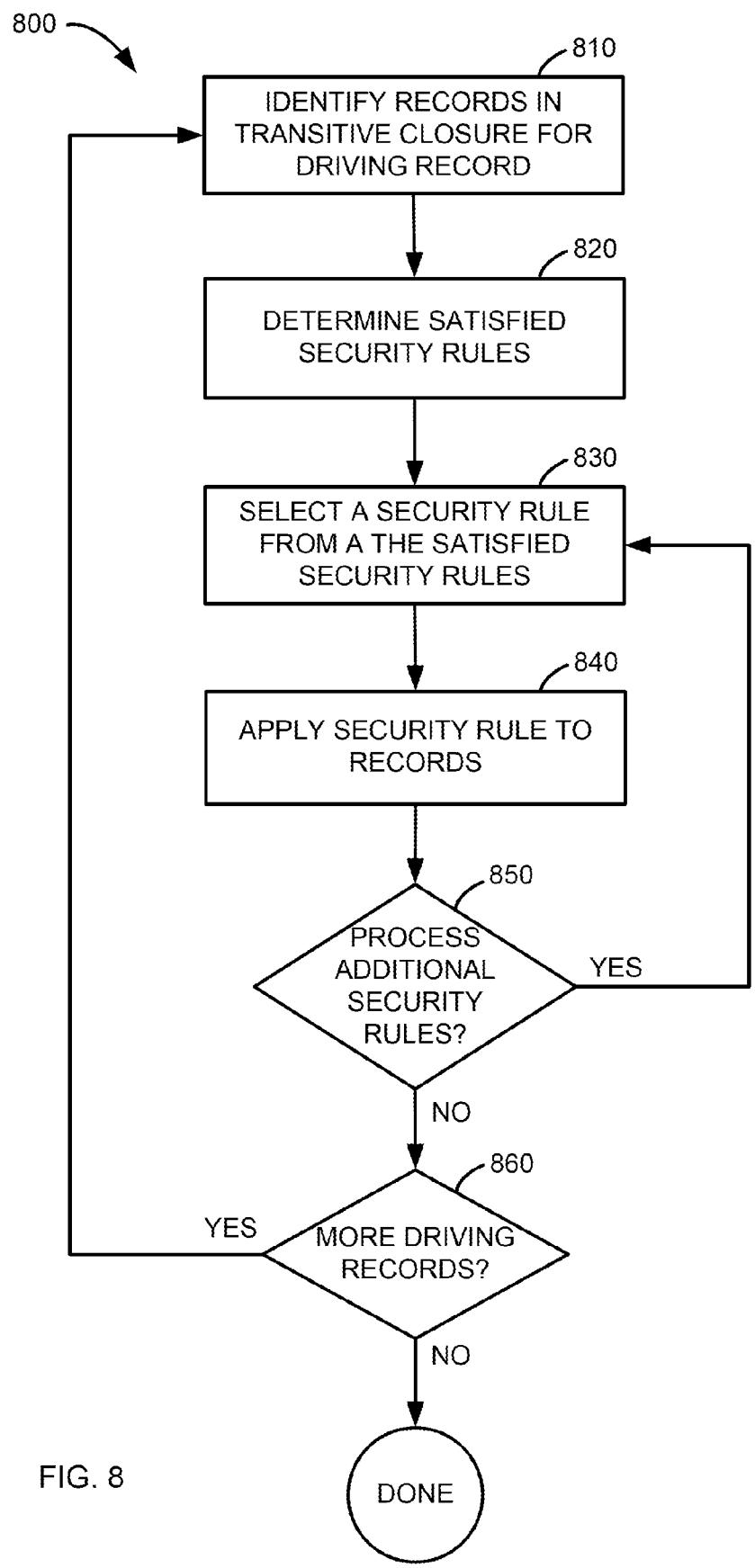
FIG. 8 is a flowchart of a transitive closure security process, according to another implementation.

FIG. 8 is a flowchart of a transitive closure security process, according to another implementation. Records in a transitive closure of a driving record are identified at block 810, and a transitive closure security system implementing process 800 then determines which security rules in a group of security rules are satisfied by records in the transitive closure at block 820. For example, some records can satisfy multiple security rules and some security rules may not be satisfied by any records in the transitive closure.

A security rule is then selected at block 830 from the satisfied security rules. For example, security rules can be selected based on a rule identifier of the satisfied security rules, based on a security level of the satisfied security rules, based on a scope of the satisfied security rules, or based on other parameters, properties, characteristics, preferences, and/or policies of the transitive closure security system implementing process 800. For example, a security rule that is not less specific than any others of the satisfied security rules can be selected. Alternatively, for example, a security rule can be selected based on a rule identifier of the security rule and a policy or preference of transitive closure security system implementing process 800. As yet another example, the security rule with a security target that provides a highest level of security or is most secure among the satisfied security rules can be selected (e.g., based on security levels of the satisfied security rules). Moreover, a security rule with a security level that is not less than the security levels of the other security rules can be selected (i.e., the security rule is not less secure than the other security rules). In some implementations, other considerations such as a size or available capacity of a data store or physical security associated with a security target can be included in selecting a security rule.

After the security rule is selected, the security rule selected at block 830 is applied at block 840 to records in the transitive closure identified at block 810. In some implementations, the security rule is applied according to or in conformity with a scope or scope identifier of the security rule. For example, the security rule can be applied to all the records in the transitive closure, the records from the transitive closure that satisfy the security rule, or to the portions (e.g., fields) of records from the transitive closure that satisfy the security rule. As a specific example, if the scope of the security rule is a transitive closure scope, each record identified in the transitive closure at block 810 is assigned to a security target identified at (or in) the security rule.

If additional security rules are to be processed at block 850, process 800 returns to block 830 to select another security rule. For example, process 800 can return to block 830 to select a security rule that has a scope different from the scope of the security rule selected during the previous iteration of block 830. As another example, process 800 can return to block 830 to select a security rule that is satisfied by records that did not satisfy the security rule selected during the previous iteration of block 830. As a specific example, a security rule that has a maximum security level (e.g., a security level that is not less than the security levels of other satisfied security rules) and a transitive closure scope can be selected at a first iteration of block 830, and a security rule that has a maximum security level and a record scope can be selected at a second iteration of block 830. Thus, different scopes, for example, of security can be applied to records in a transitive closure.

Whether additional security rules should be processed can be determined based on a policy or preference of a transitive closure security system. For example, a policy of a transitive closure security system can require that only a single security rule with a maximum security level and a transitive closure scope be applied to records of a transitive closure. As another example, a policy of a transitive closure security system can require that at least one security rule with a transitive closure scope be applied to records of a transitive closure, and can allow additional security rules (e.g., security rules of different security rules and/or scopes) to be applied to records of a transitive closure.

In some implementations, if a conflict between security rules cannot be resolved by a data store recovery system, a security target can be changed to a temporary target suitable for manual processing by a user such as a system administrator. For example, the records in a transitive closure can be assigned or moved to a quarantine site, or be marked or identified as quarantined.

If no additional security rules should be processed at block 850, process 800 proceeds to block 860 to determine whether additional driving records should be considered or handled. If there are additional driving records, process 800 returns to block 810. For example, a transitive closure security system implementing process 800 can access multiple archive policies, each of which defines one or more driving records. Process 800 can iterate through blocks 810, 820, 830, 840, and 850 for each driving record.

Alternatively, for example, multiple driving records can be handled in parallel at block 810 to define the transitive closure at block 810. For example, the transitive closure identified at block 810 can be a combination of transitive closures for each of multiple driving records. As specific example, the records in the transitive closure identified at block 810 can be defined by the intersection, union, subtraction, and/or other set operations of transitive closures for each of multiple driving records. In other words, records that are related to some combination of a group of driving records can be included in the transitive closure identified at block 810.

If no additional driving records should be considered at block 860, process 800 can complete. Although one example of a transitive closure security process is illustrated in FIG. 8, additional, fewer, or different blocks can be included at process 800. For example, one or more blocks at which records to which a security rule has been applied are removed from a data store. In some implementations, records can be removed from a data store after any security rule has been applied to them. For example, such a block can be included after block 840. In other implementations, records are not removed until all driving records have been considered. Accordingly, such a block can be included after block 860. Moreover, blocks of process 800 can be rearranged.

Figure 9:
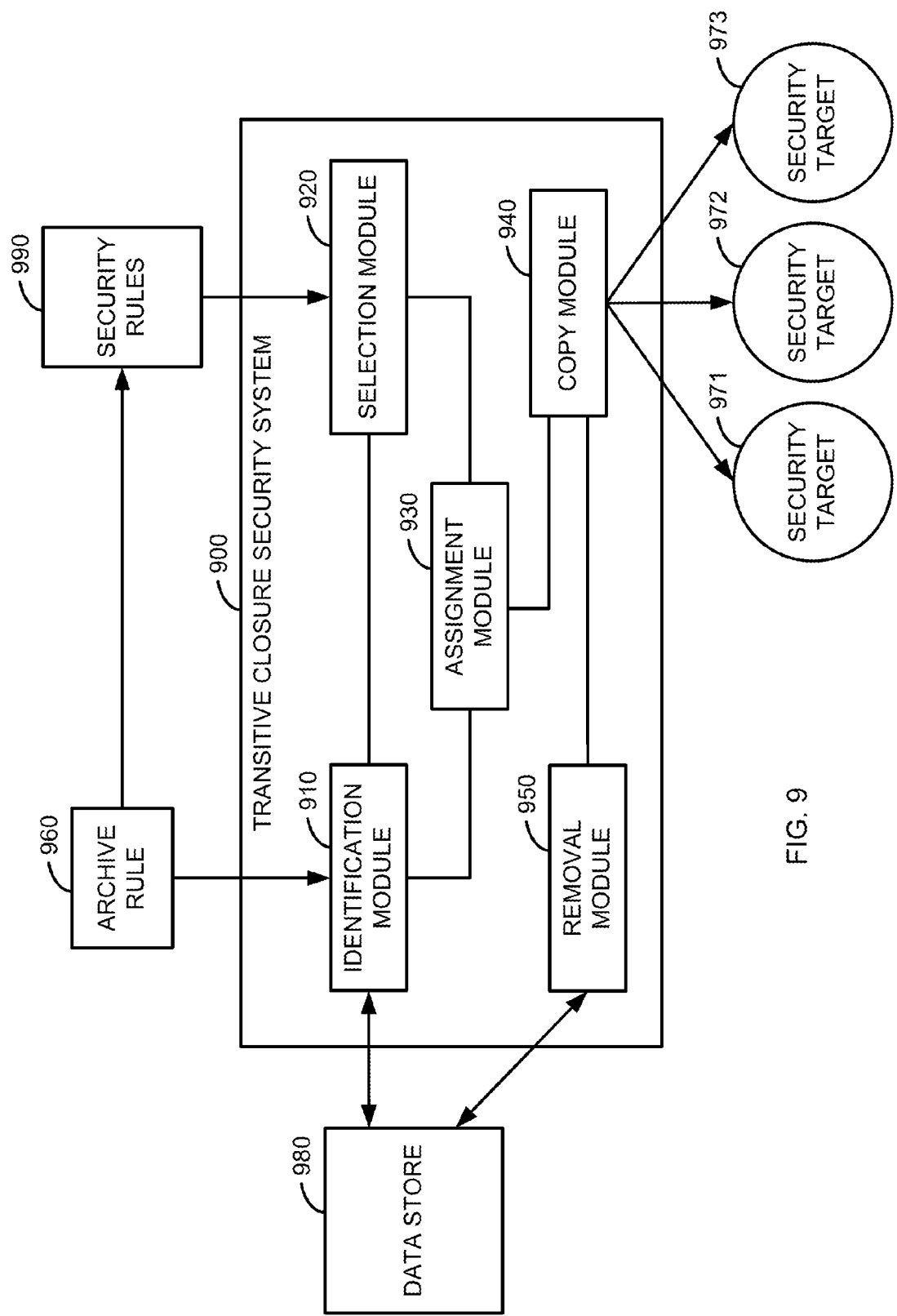
FIG. 9 is an illustration of an environment including a transitive closure security system, according to another implementation.

FIG. 9 is an illustration of an environment including a transitive closure security system, according to another implementation. Similar to transitive closure security system 100 illustrated in FIG. 1, transitive closure security system 900 includes identification module 910, selection module 920, and assignment module 930. Additionally, transitive closure security system 900 includes copy module 940 and removal module 950. Identification module 910, selection module 920, and assignment module 930 have similar operation and functionalities as those of identification module 110, selection module 120, and assignment module 130, respectively, illustrated in FIG. 1 and discussed above. For example, identification module 910 accesses archive policies and/or eligibility rules for a driving record at archive rule 960, selects a driving record at data store 980 based on the archive policies and/or eligibility rules, and identifies records at data store 980 in a transitive closure of that driving record. Selection module 920 accesses security rule 990 defined or described at archive rule 960, and selects a security rule for the transitive closure. Assignment module 930 then assigns the records in the transitive closure to a target identified by the security rule (or by some other policy or preference of transitive closure security system 900).

Copy module 940 copies records from data store 980 to one or more security targets 971, 972, and 973 based on the security targets to which those records were assigned by assignment module 930. In some implementations, copy module 940 can establish or support a secure communication channel or session with one or more security targets 971, 972, and 973. In some implementations, one or more security targets 971, 972, and 973 are encryption modules, and copy module 940 copies records to one or more security targets 971, 972, and 973 by providing those records to the encryption modules. In some implementations, one or more security targets 971, 972, and 973 include an encryption modules and a data store other than data store 980. Accordingly, copy module 940 copies records to one or more security targets 971, 972, and 973 by providing those records to the encryption modules and then copying the resulting encrypted records to the other data store.

Removal module 950 removes records from data store 980, for example, to prevent future access to those records at data store 980. Removal of records can include various operations and be implemented using various methodologies. For example, records can be removed by altering metadata related to those records to indicate that those records are no longer valid. In some implementations, removal of records includes over-writing records, masking records, scrubbing records, multiple over-writes of the records, and/or other secure removal or deletion mechanisms or methodologies.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

What is claimed is:

1. A non-transitory, processor-readable medium storing code representing instructions that when executed at a processor cause the processor to:
   identify for a first record in a data store, a plurality of records, the plurality of records includes all records in the data store that are directly or indirectly related to the first record according to one or more relationships including at least one data-store-independent relationship that an application defines using portions of the plurality of records, the plurality of records including a first plurality of sub-records and a second plurality of sub-records;
   determine that the first plurality of sub-records satisfies a first security rule;
   determine that the second plurality of sub-records satisfies a second security rule;

encrypt, based on the first security rule, the first plurality of sub-records;

encrypt, based on the second security rule, the second plurality of sub-records;

selecting the first security rule from a first plurality of security rules, each security rule from the first plurality of security rules is satisfied by at least one record from the first plurality of sub-records, the first security rule has a security level that is not less secure than a security level of each other security rule from the first plurality of security rules; and selecting the second security rule from a second plurality of security rules, each security rule from the second plurality of security rules is satisfied by at least one record from the second plurality of sub-records, the second security rule has a security level that is not less secure than a security level of each other security rule from the second plurality of security rules.

2. The non-transitory, processor-readable medium of claim 1, wherein encrypting the first and the second plurality of sub-records includes assigning the first and the second plurality of sub-records to a security target associated with the first and the second security rules.

3. The non-transitory, processor-readable medium of claim 1, further storing code representing instructions that when executed at a processor cause the processor to provide the first record and the plurality of records to a security target associated with the security rule.

4. The non-transitory, processor-readable medium of claim 1, further comprising instructions that when executed at a processor cause the processor to:

determine that the first security rule has a security level that is more secure than a security level of the second security rule.

5. The non-transitory, processor-readable medium of claim 1, further comprising instructions that when executed at a processor cause the processor to:

determine that the second security rule is more specific than the first security rule.

6. The non-transitory, processor-readable medium of claim 1, further storing code representing instructions that when executed at a processor cause the processor to remove the first record and the plurality of records from a data store.

7. The non-transitory, processor-readable medium of claim 1, further storing code representing instructions that when executed at a processor cause the processor to access the first record at a data store based on an archive rule.

8. The non-transitory, processor-readable medium of claim 1, wherein:

the transitive closure is defined based on a plurality of relationships; and the plurality of relationships includes the at least one data-store-dependent relationship.

9. The non-transitory, processor-readable medium of claim 1, wherein identifying the plurality of records of the first record comprises:

identifying in the first record a value of the portion that the application uses to define the at least one data-store-independent relationship; and searching the data store for each record that has a corresponding portion with a value indicating the least one data-store-independent relationship to the first record.

10. A transitive closure security system, comprising:

a processor and a memory;

an identification module to identify a plurality of records, wherein the plurality of the records includes all records in the data store that are directly or indirectly related to a first record in the plurality of records according to one or more relationships including at least one data-store-independent relationship that an application defines using portions of the plurality of records, the plurality of records including a first plurality of sub-records and a second plurality of sub-records;

a selection module to:

determine that the first plurality of sub-records satisfies a first security rule;

determine that the second plurality of sub-records satisfies a second security rule;

an assignment module to:

encrypt, based on the first security rule, the first plurality of sub-records;

encrypt, based on the second security rule, the second plurality of sub-records;

select the first security rule from a first plurality of security rules, each security rule from the first plurality of security rules is satisfied by at least one record from the first plurality of sub-records, the first security rule has a security level that is not less secure than a security level of each other security rule from the first plurality of security rules; and select the second security rule from a second plurality of security rules, each security rule from the second plurality of security rules is satisfied by at least one record from the second plurality of sub-records, the second security rule has a security level that is not less secure than a security level of each other security rule from the second plurality of security rules.

11. The system of claim 10, wherein the security rule has a security level that is not less secure than a security level of each other security rule from the plurality of security rules.

12. The system of claim 10, further comprising:

a copy module to copy the plurality of records to the security target after the plurality of records are assigned to the security target; and a removal module to remove the plurality of records from the data store after the plurality of records are copied to the security target.

13. The system of claim 10, wherein the first record is defined at an archive rule.

14. The system of claim 10, wherein:

the plurality of records is defined based on the plurality of relationships; and the plurality of relationships further includes at least one data-store-dependent relationship.

15. The non-transitory, processor-readable medium of claim 10, wherein identification module operates to identifying the plurality of records by:

identifying in the first record a value of the portion that the application uses to define the at least one data-store-independent relationship; and searching the data store for each record that has a corresponding portion with a value indicating the least one data-store-independent relationship to the first record.

16. A security method preformed in a computing system, the method comprising:

identifying a plurality of records, wherein the plurality of records includes all records in a data store that are directly or indirectly related to a first record within the plurality of records according to one or more relationships including at least one data-store-independent relationship that an application defines using a portion of the plurality of records, the plurality of records including a first plurality of sub-records and a second plurality of sub-records;

determining that the first plurality of sub-records satisfies a first security rule;

determining that the second plurality of sub-records satisfies a second security rule;

encrypting, based on the first security rule, the first plurality of sub-records;

encrypting, based on the second security rule, the second plurality of sub-records;

selecting the first security rule from a first plurality of security rules, each security rule from the first plurality of security rules is satisfied by at least one record from the first plurality of sub-records, the first security rule has a security level that is not less secure than a security level of each other security rule from the first plurality of security rules; and selecting the second security rule from a second plurality of security rules, each security rule from the second plurality of security rules is satisfied by at least one record from the second plurality of sub-records, the second security rule has a security level that is not less secure than a security level of each other security rule from the second plurality of security rules.

17. The method of claim 16, further comprising encrypting, based on the first security rule, the second plurality of sub-records.

18. The method of claim 16, further comprising:

determining that the second security rule is more specific than the first security rule; and encrypting, based on the first security rule, the second plurality of sub-records.

19. The method of claim 16, wherein identifying the plurality of records included in the plurality of records of the first record comprises:

identifying in the first record a value of the portion that the application uses to define the at least one data-store-independent relationship; and searching the data store for each record that has a corresponding portion with a value indicating the least one data-store-independent relationship to the first record.

* * * * *

UNITED STATES PATENT AND TRADEMARK OFFICE
CERTIFICATE OF CORRECTION

PATENT NO. : 9,208,343 B2
APPLICATION NO. : 13/212371
DATED : December 8, 2015
INVENTOR(S) : Yu Gong et al.

Page 1 of 1

It is certified that error appears in the above-identified patent and that said Letters Patent is hereby corrected as shown below:

In the claims,

In column 15, line 43, in Claim 6, delete "a" and insert -- the --, therefor.

In column 15, line 47, in Claim 7, delete "a" and insert -- the --, therefor.

In column 16, line 57, in Claim 16, delete "preformed" and insert -- performed --, therefor.

In column 16, line 64, in Claim 16, delete "using a portion" and insert -- using portions --, therefor.

Signed and Sealed this
Fifth Day of April, 2016

Michelle K. Lee
*Director of the United States Patent and Trademark Office*